United States Patent

[11] 3,576,144

| [72] | Inventor | Frank L. Strah |
| | | 770 Kenbridge Drive, Richmond Heights, |
| | | Ohio 44124 |
| [21] | Appl. No. | 835,192 |
| [22] | Filed | June 20, 1969 |
| [45] | Patented | Apr. 27, 1971 |

[54] PART LOADER FOR TURRET LATHES OR THE LIKE
15 Claims, 7 Drawing Figs.

[52] U.S. Cl. .................................................. 82/2.5,
82/38, 279/1
[51] Int. Cl. ...................................................... B23b 13/02
[50] Field of Search........................................... 82/2.5, 2.7,
38; 279/(1A), (1SG), (1ME), 5, 14, 24

[56] References Cited
UNITED STATES PATENTS
1,154,450  9/1915  Smolensky .................... 82/38X 3,177,744  4/1965  Davidson et al. .............  82/38
FOREIGN PATENTS
612,826  11/1948  Great Britain................  82/2.5

*Primary Examiner*—Leonidas Vlachos
*Attorney*—Ely, Golrick & Flynn

ABSTRACT: Loading tooling, for workpieces with noncircular portions gripped in a continuously rotating chuck of a turret lathe or like machine, comprises on the chuck a gripping socket and an element having a pin-receiving hole parallel to the axis of rotation with a lead-in groove; and on the turret, shiftable between a hand loadable and a transfer position, a transfer device including a snubbed body rotatable on a turret-received shank having a frictional workpiece gripping recess, and a pin so located on the body relative to the recess that upon axial turret-shifting of the device in transfer position relative to the chuck, that pin pickup in the hole rotatingly picks up the body with the workpiece aligned for reception and gripping in the chuck.

INVENTOR.
FRANK L. STRAH
BY
*Ely, Dobrick & Flynn*
ATTORNEYS

PART LOADER FOR TURRET LATHES OR THE LIKE

In operation of turret lathes and like machines, hand loading of workpieces into the work gripping and driving head (hereinafter usually referred to as a chuck, though it may be a chuck or collet) entails several obvious disadvantages, such as, among others, necessity of stopping the spindle in order to load the workpiece, attendant loss of machine and operator time and energy in the work cycle entailed in the manual handling of the workpiece and by the stopping and bringing up to speed thereafter, and from a plant safety viewpoint also danger inherent in such operations where a part is hand loaded directly into the chuck. However, where a nonround portion of a workpiece is to be chucked, hand loading is common practice with simpler machines. It is the general object of the present invention to eliminate or minimize one or more of such disadvantages of hand loading.

Another object of the present invention is to provide a relatively simple part loader arrangement particularly adapted for loading, into the chuck or collet of a turret lathe or the like, of workpieces to be gripped or chucked on a nonround portion while the check or collet is continuously driven.

Another object is to provide means for loading a succession of like workpieces into the chuck of a turret lathe or in like work gripping devices obviating need for hand loading procedures in which the operator's hands are necessarily brought between the chuck and the turret into the path of advance of the turret.

Another object is the provision of means of the character described readily adapted to changing from a run of workpieces of one form to a run of another form.

One embodiment of the invention, and other objects and advantages, will appear from the following description and the drawings wherein.

Figure 1:
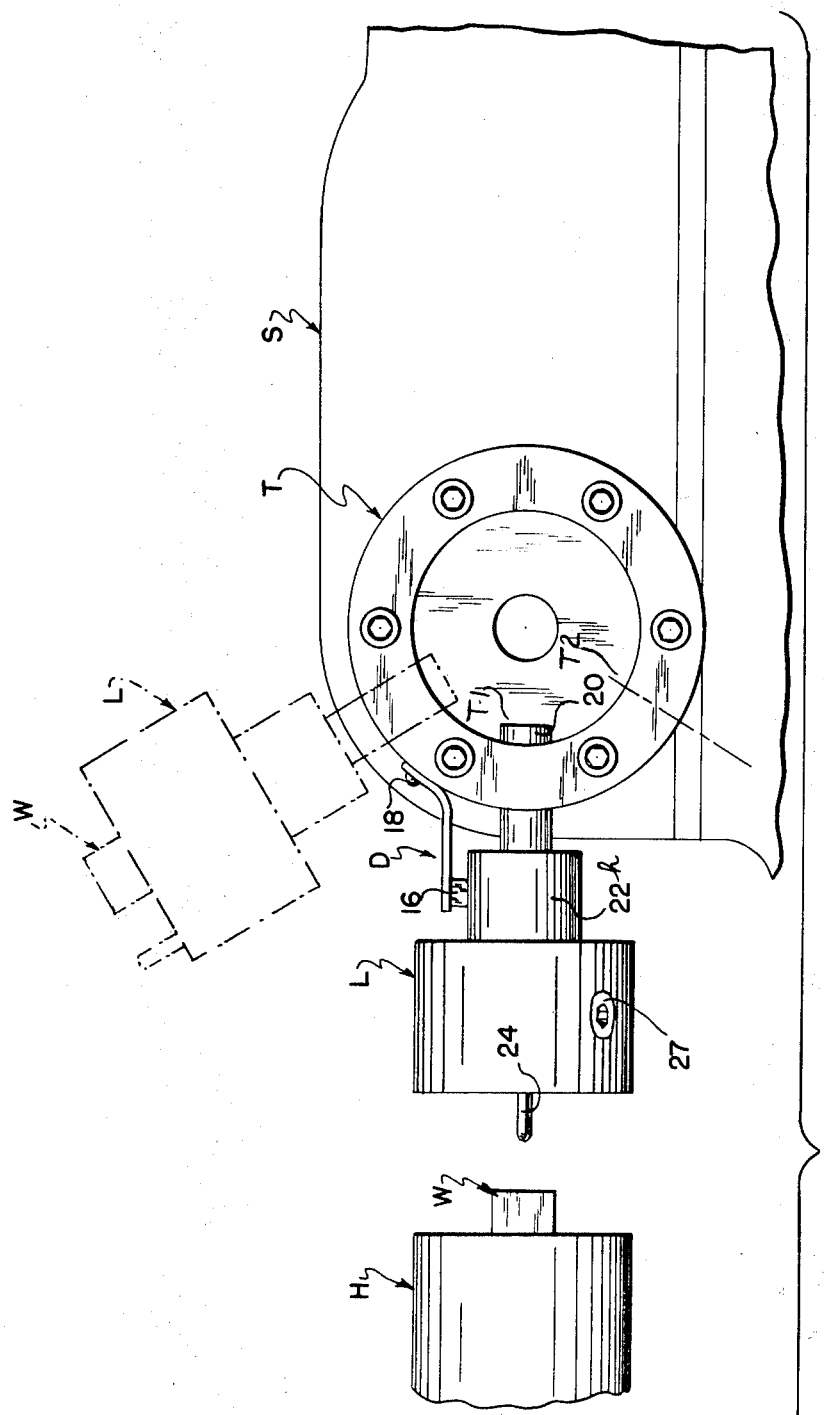
FIG. 1 is a fragmentary front elevational view of a horizontal turret lathe in which the present invention is applied.

In the drawings, one form of the invention is shown as applied, by way of example, to a turret lathe represented in fragmentary form by the workpiece-gripping head H continuously driven on a continuously rotating spindle, and a six-station tool mounting turret T, rotatable about a horizontal axis to any one of six equiangularly spaced positions to bring tooling into cooperating opposed relation to the work-gripping head, toward and away from which it is axially shifted by advance and retraction of the turret-carrying machine saddle or main slide S whether by entirely manual operation, by well-known mechanism and controls, or by combinations of these for advance and retraction of the turret with intervening shifting of the turret to bring tools into operable position, as known to the art for such machines. Such mechanism as well as the details of the work-gripping mechanism and controls, being well known to the art as well as the operations carried out and tooling therefor, are not her shown.

Figure 3:
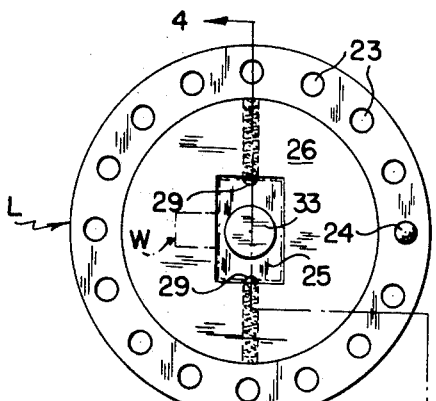
FIG. 3 is an elevational view of the working face of the turret-secured part of the workpiece loading tooling.
Figure 4:
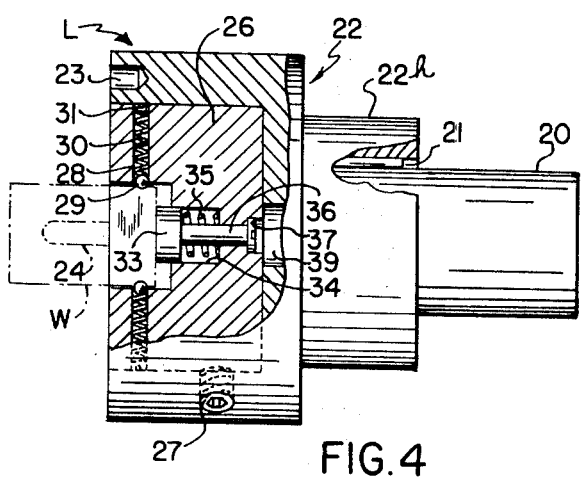
FIG. 4 is a front view partially in section taken as indicated by the line 4—4 in FIG. 3.
Figure 7:
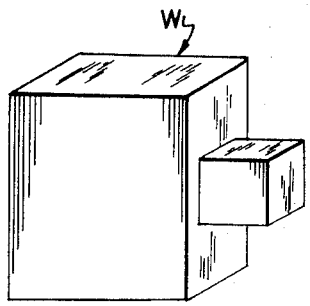
FIG. 7 is a perspective view of a workpiece which the structure of the preceeding FIGS. is adapted to handle, given by way of an example.

The specific structure of the present invention is embodied in an annular synchronizing plate P (see FIG. 2) mounted on (or alternatively an integral portion of) the body end face of and concentrically surrounding the rotational axis of the workpiece-gripping chuck head H, the latter here shown as a split collet C adapted to grip the noncircular end of a workpiece W (see FIG. 7) received in a correspondingly shaped gripping socket or recess 11, and in the workpiece loading or transfer tooling assembly L (see FIGS. 1, 3 and 4) mounted in one station or tool holding location of the turret T, including a drag device D.

In the annular region provided by the synchronizing plate P there is at least one guide pin engaging bore of hole 12 extending parallel to the axis of chuck rotation with an associated guide or lead-in groove 13; and (see details FIGS. 5 and 6) here, where the portion of the workpiece as gripped has twofold rotational symmetry relative to the axis of rotation, there being two such holes 12 with associated grooves disposed in diametrically opposed locations.

Figure 5:
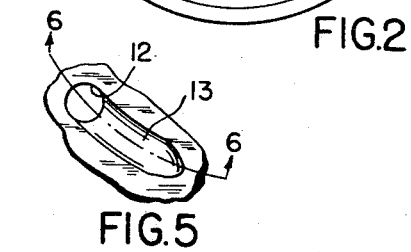
FIG. 5 is an enlarged fragmentary view showing details of a pin-receiving hole and lead-in or guide groove on the chuck head of FIG. 2.
Figure 6:
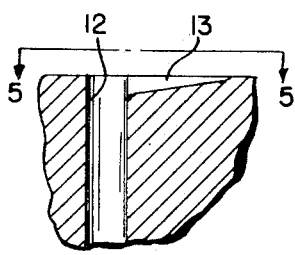
FIG. 6 is a fragmentary section taken along the line 6—6 in FIG. 5.

As seen in FIGS. 5 and 6, such a groove 13 is arcuately shaped coaxially with the axis of head rotation and from a shallow initial end point leads with gradual deepening to merge into and terminate in the hole 12, so that in effect the groove extends away from the hole 12 shallowing in the direction of rotation.

Figure 2:
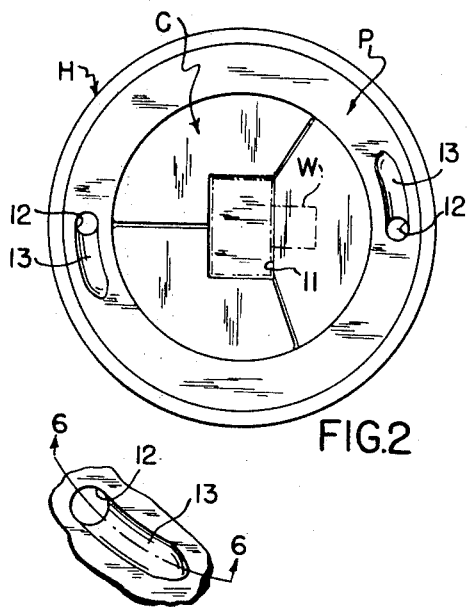
FIG. 2 is an elevational view of the working end of that portion of the workpiece-loading tooling carried on the continuously driven work-gripping head of the machine.

The loading tool assembly or device L is comprised of a stationary shank 20, adapted to be secured in the turret T, at T1, rotatably supporting a main generally cylindrical hollow body portion 22 by an appropriate bearing 21 in the reduced diameter hub portion 22h. The bearing 21, adapted to sustain axial as well as radial loading, for which many forms are known, is represented only in generalized form. As seen in FIG. 1, the external cylindrical reduced surface of 22h is engaged by the pressure pad 16 of the drag device D carried by a resilient or spring arm 17 bolted at 18 to a surface of the turret.

The working face (left end in FIG. 4) of body 22 is provided with a series of similar equiangularly spaced bores or holes 23, in a selected one of which there is disposed a pin 24 substantially equal in diameter to, slightly smaller for a sliding clearance with, the holes 12. The axes of holes 23 are parallel to the axis of rotation, the centerline of the device L, which becomes coaxial with the axis of rotation of head H when device L is in workpiece transferring position; the bores or holes 23 located on a circle of radius equal to the spacing, from the head rotation axis, of the centerline arc of the groove 13 or location of the axes of the holes 12.

In the working face of body 22 a receiving socket or recess 25 is disposed relative to the axis of rotation and to the location of pin 24 in an orientation and position mirror image related to the location or orientation of the recess 11 and a hole 12 in the head H. Here to provide adaptability to workpieces of different sizes and shapes with a minimum of tooling expense, rather than being formed in an end face of a solid metal body constituting 22, the recess 25 is formed in a cylindrical block or "pot" element 26 received in a correspondingly sized bore in the body 22 and there held in appropriate orientation by one or more lock screws, such as the socket head set screw 27, threaded radially through the resulting hollow cylindrical wall or body flange 22f in the annular end face of which the series of holes 23 is bored.

The socket in recess 25 is cross-sectionally dimensioned and shaped to receive the workpiece W in a close but smooth and ready sliding hand fit; and in a detentlike structure, for additional frictional retention, in each of aligned diametric bores 28 entering two opposed sidewalls of the recess a pressure element such as a ball 29 is urged against the workpiece by a bias spring 30 reacting against a retaining means 31, such as a headless screw threaded as a plug into the outer end of the bore; the ball 29 being retained by a circumferential lip formation at the inner end of the respective bore.

To minimize opportunity of damage to a workpiece by some mishap misaligned in its approach to socket 11 in operations hereinafter described, as an inserted workpiece locating platform or yieldable bottom for the recess, a plunger 33 is outwardly spring biased to the left in a bore 34 by a moderately stiff helical compression spring 35 surrounding the integral plunger stem 36 slideable in a still smaller bore coaxial with 34 as a guiding surface. The outer end of the latter bore is counterbored to accommodate, as a plunger retainer 37, the flat head of a screw threaded into the end of stem 36.

Accordingly at 39 coaxially with the stem 36, the radial inner body end wall is either recessed or bored straight through the shank to allow inward motion to the workpiece supporting plunger 33.

The end-rounded pin 24 of hard steel is selected longer than the projecting portion of the part W by an amount somewhat greater than its depth of insertion into its hole 23 (that is, the effective hole depth on which it bottoms) plus the depth of the groove 13 at the point where it merges into the hole 12.

It will be observed that with the turret-carried means L swung to the dashed outline position of FIG. 1, the working face is removed from the chuck region and facing generally upward for convenient and safe manual insertion of a workpiece into recess 25 against the plunger 33 as an effective locating stop or bottom against manual insertion force by the bias force of spring 35; the "detent" type balls frictionally retaining the piece in subsequent motion.

Thereafter with assembly L swung by the turret into a horizontal position opposed to the head H, (the position of FIG. 1, through with W still present in L rather than H) upon axial advance of turret T by ram or saddle motion, the rounded end of pin 24 encounters the flat peripheral annular face of the synchronizing element P before the piece W reaches the collet end face. As the saddle advance force is applied through a lost motion or yieldable mechanism such as a compression spring or air cylinder, the pin 24 encountering P stops advance of the turret without damage.

The motion of the continuously driven head H begins to be transmitted frictionally through the pin 24 (sliding on the annular face of P) to the body 22 accordingly beginning to rotate on the shank 20. The drag device D retarding rotation of 22 ensures that the pin 24 does not simply frictionally engage and as it were stick at a point of contact, but rather there is a relative dragging of the P over the pin end, until the pin traverses one of the lead-in grooves 13 and is able to begin entering the associated hole 12. At this stage then, when further turret advance becomes possible, the free end of piece W to be gripped is aligned with and correctly rotationally oriented to enter collet socket 11; and such further advance carries the workpiece into the chucking recess 11.

Thereafter, the chucking mechanism having been actuated to grip the part, saddle retraction of the turret withdraws piece W from recess 25; this point of operations being actually represented by FIG. 1. The turret then rotates clockwise swinging the device L upwardly again into the dashed outline position ready for manual loading with a new part, and simultaneously the tool (not shown) of station T2 swings into position for machining the workpiece in the collet upon ensuing turret advance.

The drag D becomes effective to start braking the rotation of body 22 as soon as the driving connection from H to body 22 through pin 24 and piece W is broken, i.e., with pin 24 out of hole 12 and piece W clear of the recess 25, so that the body 22 is stationary either by the time it reaches the dashed position or shortly thereafter depending upon the force exerted at pad 16.

By use of the pot construction, for workpiece having different shaped ends to be gripped in L, it is merely necessary to have on hand different pots or blocks 26 with their associated plunger and retainer structures rather than entire respective assemblies L, as the pin 24 may be located as needed. In the head H, similarly a respective collet C is required for each differently shaped collet-gripped end in different workpieces; and the same element P may serve for several different pieces having at least two-fold, even, rotational symmetry. The series of holes 23 provide flexibility in placement of pin 24 relative to a cavity or socket 25 of any given pot 26 and the location of its locating recess receiving the end of screw 27, which recess may be varied in position from pot to pot if required effective- sections, with the piece to be gripped with its longitudinal axis colinear with the axes of rotation of 14 and of body 22. However, obviously the two ends can be different in shape, in which case the sockets or recesses 11 and 25 would correspondingly differ, and also for irregular parts or parts to be drilled or machined eccentrically from a main longitudinal axis, the recesses or sockets may be accordingly offset from the axes of rotation of H and L.

Thus the invention would be applicable where geometrical regular nonround portions of workpieces are gripped in coaxial or noncoaxial disposition relative to the axis of rotation, or irregular portions are gripped, or even a cylindrical portion with axis parallel-offset from the axis of rotation; of all which situations, the common condition is that the gripped portion of workpieces, as gripped, represents a surface (whether continuous or not) other than a cylinder coaxial with the rotational axis. Moreover, the principles of the invention may be applied to loading workpieces to an internal chucking device; and the term chuck as used here and in the claims signifies all such workpiece-gripping devices as may be actuated to a gripping or released condition while rotating.

The savings in time by the continuous drive of head H, also the manual insertion of workpieces W in L while a cutting operation is carried out on a preceeding part should be evident, whether this loading and transferring tooling is used on a hand turret lathe or an automatic screw machine. If desired two like such devices L may be used at different stations on the turret one for loading and another for unloading the part from the collet.

I claim:

1. Tooling for loading a series of like workpieces into a continuously rotationally driven chuck, where the gripped portion of said workpieces as gripped represents a surface other than cylinder coaxial with the rotational axis of said chuck, comprising:

means on the chuck providing
an annular surface concentric with said rotational axis and
a pin-receiving socket opening at said annular surface extending parallel to said rotational axis, said socket offset from said rotational axis and from the workpiece-gripping region of the chuck,
a rotatable loading head rotatable about a rotational axis perpendicular to a working face of the head, means mounting the head with its rotational axis alignable with the rotational axis of said chuck and for relative reciprocation with respect to said chuck when said rotational axes are aligned and working face of said head is disposed toward said chuck, said loading head including a finder pin projecting parallel to the head axis from said working face and receivable in said socket upon advance of said head means toward said gripping device whereby the head means is rotationally drivably coupled to the rotating chuck,
said loading head including workpiece-gripping means adapted in workpiece-receiving shape to hold a piece so oriented relative to said pin that, after engagement of the pin in said socket in continuing relative approach between said head and said means, said workpiece is presented to said gripping device in correct loading disposition and orientation to be received and gripped therein.

2. Tooling as described in claim 1, wherein the first said means is removably changeably secured on said chuck.

3. Tooling as described in claim 1, with said loading head further mounted for swing, about an axis perpendicular to its axis of rotation, to and from aligned condition relative to said gripping device, whereby the working face of said loading head may be swung away from said chuck for insertion of a 5. Tooling as described in claim 1, wherein the first said means providing the pin-receiving socket includes in said annular surface an arcuate pin lead-in groove concentric with the chuck rotational axis leading with increasing depth from the direction of rotation into said socket.

6. Tooling as described in claim 1, wherein the workpiece-gripping means on said head comprises a piece-receiving recess in said working face and workpiece-engaging means in said recess.

7. Tooling as described in claim 6, wherein a spring biased plunger slideable in said head provides a yieldable bottom for said recess.

8. Tooling as described in claim 1, wherein the workpiece-gripping means on said head comprises a piece-receiving recess in said working face and frictional workpiece-engaging means in opposed walls of said recess.

9. Tooling as described in claim 6, wherein said piece-receiving recess is provided in a changeable block removably secured in a cavity formed in said working face.

10. Tooling as described in claim 6, wherein said peice-receiving recess is provided in a changeable block removably secured in a cavity formed in said working face; the effective bottom of said recess formed by an outwardly spring-biased platform.

11. Tooling as described in claim 9, wherein said loading head is provided with a plurality of pin-receiving apertures in which a said pin may be removably secured selectively for adaptation to different workpieces.

12. Tooling as described in claim 1, adapted to load workpieces in which the gripped portion has N-fold rotational symmetry about the axis of chuck rotation and wherein the first said means provides N pin-receiving sockets equiangularly and equiradially spaced about and from the chuck rotational axis.

13. Tooling as described in claim 12, wherein the first said means includes for each said socket an arcuate pin lead-in groove concentric with the chuck rotational axis leading with increasing depth into said socket from the direction of rotation.

14. Tooling as described in claim 1, wherein said loading head includes a body, a shank adapted to be secured in a tool holding turret of an automatic screw machine or the like, and bearing means in said body rotatably mounting the body on said shank.

15. Tooling as described in claim 14 including an arm secured in fixed relation relative to said shank and supporting a friction pad biased against a cylindrical surface on said body coaxial with the shank, thereby providing a drag braking said body upon pin-disengaging retraction of the loading head from the chuck and, upon engagement of said pin with said annular surface, dragging said pin on said annular surface to find said socket.